United States Patent [19]

Kuwagaki et al.

[11] 4,379,619

[45] Apr. 12, 1983

[54] ELECTRO-CHROMIC DISPLAYS

[75] Inventors: Hiroshi Kuwagaki, Kyoto; Kohzo Yano; Sadatoshi Takechi, both of Nara, all of Japan

[73] Assignee: Sharp Kabushiki Kaisha, Osaka, Japan

[21] Appl. No.: 218,419

[22] Filed: Dec. 19, 1980

[30] Foreign Application Priority Data

Dec. 26, 1979 [JP] Japan .................. 54-170974

[51] Int. Cl.³ .............................. G02F 1/17
[52] U.S. Cl. ......................... 350/357; 350/343
[58] Field of Search ............ 350/357, 343; 174/50.5, 174/50.52, 52 R, 52 S

[56] References Cited

U.S. PATENT DOCUMENTS 4,078,855  3/1978  Fujita et al. ................. 350/343
4,264,150  4/1981  Yano et al. ................... 350/357

*Primary Examiner*—James W. Davie
*Attorney, Agent, or Firm*—Hubbell, Cohen, Stiefel & Gross

[57] ABSTRACT

An electro-chromic display in which the outer frame of the display cell confining an electrolyte is defined by a pair of oppositely disposed substrates, the peripheral edges of the substrates being joined sealingly to each other with an addition reaction type silicone resin adhesive containing fine powder of an inorganic substance such as aluminum, alumina, titanium oxide, silicon oxide or boron nitride which prevents decrease of said electrolyte.

3 Claims, 2 Drawing Figures

ELECTRO-CHROMIC DISPLAYS

BACKGROUND OF THE INVENTION

1. Field of the Invention

This invention relates to electro-chromic displays (ECD) utilizing the electro-chromic phenomenon, i.e., variation in the light absorption characteristics by application of appropriately controlled voltages, and more particularly, to an improvement in the sealing compound for the display cells.

2. Description of the Prior Art

Electro-chromic displays are roughly classified into two types. According to one type, the electrochromic material in a solution undergoes an electrochemical redox reaction, and forms a colored, insoluble reaction product on a cathode. The other type utilizes a thin film of an inorganic solid, such as amorphous tungsten oxide ($WO_3$), with an electrolyte such as sulfuric acid. The amorphous tungsten oxide develops a blue color if a transparent electrode coated therewith has a negative potential against the opposite electrode. Both types of electro-chromic displays are bleached of their colors if the polarity of the voltage applied thereto is reversed.

The electro-chromic display has the following features:

(1) It has a wide view angle;
(2) It is possible to develop several different colors;
(3) It consumes an amount of energy which is proportional to the number of coloration and discoloration cycles, and which is from several to several tens of mJ/cm per cycle; and
(4) It has a memory function, i.e., it can maintain the colored state for several hours or days after removal of the coloration voltage if it is kept electrically open. The memory does not require application of any electric power from an external source.

The application of the electro-chromic displays having the aforementioned features for various kinds of display apparatus is of great interest.

Reference is made to FIG. 1 showing an electrochromic display cell by way of example in cross section. A dish-shaped substrate 1 is made of glass, ceramic or like material. An counterelectrode 2 and a reference electrode 3 are formed inside the substrate 1. A transparent substrate 4 positioned on the display side of the cell carries thereon a transparent electrode 5 formed from indium oxide ($In_2O_3$), tin oxide ($SnO_2$) or the like, and a display electrode 6 formed from tungsten oxide ($WO_3$) or the like, which are both formed by vacuum evaporation. The transparent substrate 4 is usually made of glass. A white porous plate 8 is sandwiched between layers of glass fibers 7, and disposed between the counterelectrode 2 and the reference electrode 3, and the display electrode 6. The white porous plate 8 is provided for establishing a white background, but it is possible to employ a porous plate having a color which is other than white. The substrates 1 and 4 are sealingly joined to each other with an adhesive 9 to define a display cell. An electrolyte 10 is introduced into the cell through an inlet provided in the substrate 1, but not shown. The inlet is tightly closed after introduction of the electrolyte. The electrolyte 10 may comprise a cellosolve acetate or γ-butyrolactone solution of lithium perchlorate having a concentration of 1 mol per liter. A mass of bubbles 11 is provided for absorbing the difference in the degree of cubic expansion rate between the substrates 1 and 4, and the electrolyte 10.

An addition reaction type silicone adhesive, as disclosed, for example, in Japanese Laid-Open Patent Specification No. 61951/1979, has hitherto been used for sealing an electro-chromic display cell of the type hereinabove described. This adhesive comprises a silicone polymer which is addition polymerized when heated in the presence of a catalyst. It is usually a two-part adhesive which is cured in rubber or resin form by forming dimethylene bridges in accordance with the following formula:

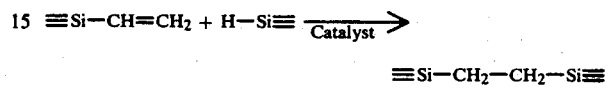

The principal features of this adhesive are as follows:

(1) It is a self-tack type adhesive which eliminates the necessity for any special pretreatment of the glass substrate;

(2) It is a solventless, addition reaction type adhesive which does not form any reaction by-product that may contaminate the electrodes in the ECD cell; and (3) As it requires a long time for curing, it has a long pot life.

Although the addition reaction type silicone adhesive has a number of excellent features as hereinabove set forth, the electrolyte in an ECD cell sealed with such a silicone adhesive leaks out in gaseous form through the adhesive layer and is lost, if the cell is maintained at a high temperature. This is an important cause for reduction in the reliability of the cell.

In view of the foregoing problems, it is an object of this invention to provide a reliable ECD cell in which no decrease occurs to the electrolyte.

SUMMARY OF THE INVENTION

According to this invention, there is provided with an electro-chromic display in which the outer frame of the display cell confining an electrolyte is defined by a pair of oppositely disposed substrates, the peripheral edges of the substrates being joined sealingly to each other with an addition reaction type silicone resin adhesive containing an inorganic substance in fine powder. The adhesive contains 2 to 100 PHR of an inorganic substance selected from the group consisting of aluminum, alumina, titanium oxide, silicon oxide and boron nitride. The use of such an adhesive is not only advantageous by virtue of its own properties, but also provides an electro-chromic display which is reliable even at a high temperature without suffering from any loss of the electrolyte.

DESCRIPTION OF THE PREFERRED EMBODIMENTS

The display device of this invention, of which the display cells are sealingly closed with an addition reaction type silicone adhesive containing an inorganic substance in fine powder, does not only avail itself of the excellent advantages of the adhesive, but is also highly reliable even at a high temperature without losing the electrolyte in the cells.

Two-part Toray silicone resin SE-1700 (trade name of Toray Industries, Inc., Japan) may be used as the addition reaction type silicone adhesive for this invention.

Examples of the inorganic substance which the adhesive contains include aluminum, alumina, titanium oxide, silicon oxide and boron nitride. The inorganic substance is used in the form of fine powder. It is preferred that the powder should have as small a grain size as possible, though too small a grain size may result in a reduction in the quantity which can be homogeneously mixed. The powder may have a grain size not greater than $60\mu$, preferably not greater than $30\mu$.

The inorganic substance prevents the electrolyte in the display cells from leaking out in gaseous form through the solidified adhesive layer. This advantage becomes more evident with an increase in the amount of the inorganic substance in the adhesive, but as the addition of too large an amount results in failure to obtain a uniform mixture, it is preferable for the adhesive to contain 2 to 100 PHR of the inorganic substance.

The addition reaction type silicone adhesive is a highly viscous liquid before solidification. The inorganic substance in the form of fine powder may be mixed into the adhesive at any time before the adhesive is applied to the cell. If the adhesive is of the two-part type, for example, it is possible to add the inorganic substance into one or both of the two components of the adhesive before they are mixed, or into the adhesive after its two components have been mixed. A uniform mixture of the adhesive and the inorganic substance can be obtained by any ordinary method employed for mixing the powder of a solid into a highly viscous liquid.

The invention will now be described in further detail by way of example.

Figure 1:
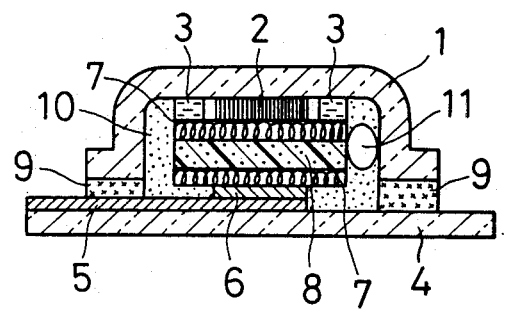
FIG. 1 is a cross-sectional view showing an ECD cell by way of example.

Several display cells of the construction shown in FIG. 1 were prepared by using addition reaction type Toray silicone SE-1700 adhesives containing different inorganic substances in fine powder, and a similar adhesive not containing any such inorganic powder as shown in TABLE 1. The adhesive was cured by heating at 150° C. for 10 minutes. Each cell was filled with about 1 g of a γ-butyrolactone solution of lithium perchlorate having a concentration of 1 mol per liter as an electrolyte.

Figure 2:
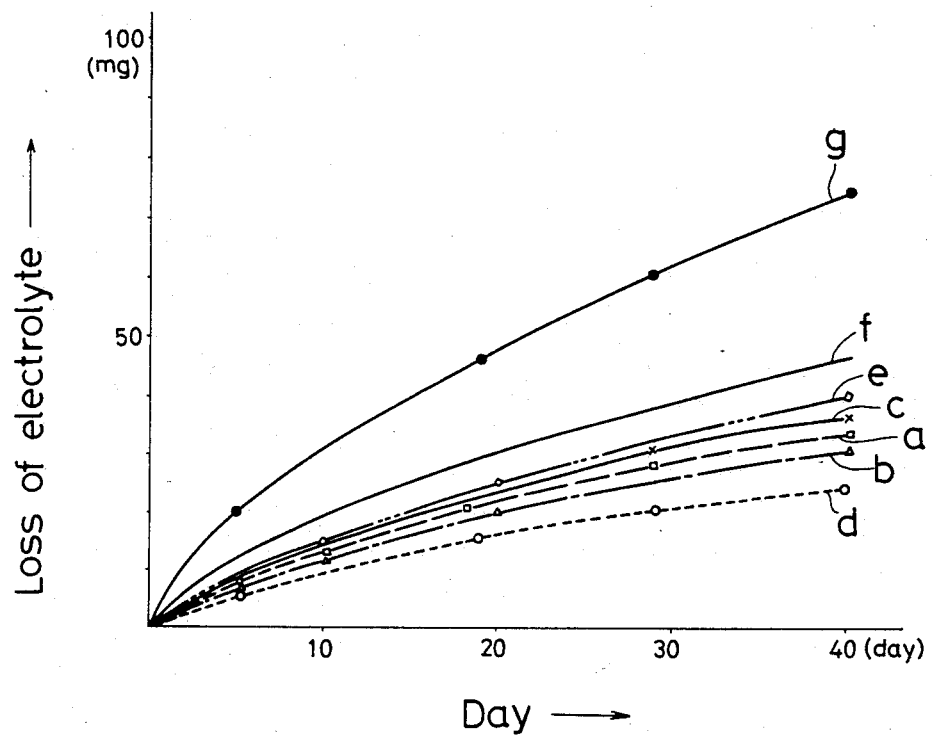
FIG. 2 is a graph showing the changes with the lapse of time in the quantity of the electrolyte in the ECD cells left at a temperature of 70° C. in order to illustrate a preferred embodiment of this invention.

The ECD cells thus formed were left in a circulating hot air bath having a constant temperature of 70° C., and their weight reduction was determined with the lapse of time. The results are shown in FIG. 2. Each curve therein represents an average value for 10 cells. The alphabetical letters assigned to the six curves in FIG. 2 correspond to those appearing in TABLE 1. The results shown in FIG. 2 clearly indicate that the addition of an inorganic substance in fine powder contributes greatly to reducing the loss of the electrolyte, and that this invention provides a superior electrochromic display which is highly reliable even at a high temperature.

TABLE 1

|  | a | b | c | d | e | f | g |
|---|---|---|---|---|---|---|---|
| Inorganic substance added | Pure alumina powder | | | Titanium oxide powder | Denka boron nitride | Silicon oxide powder Imsil A-15 | None |
| Manufacturer | Adolf Meller Co., U.S.A. | | | Kishida Chemical Co., Japan | Denki Kagaku Kogyo K.K., Japan | Illinois Minerals Co., U.S.A. | |
| Grain size | $0.06\mu$ | $1.0\mu$ | $3.0\mu$ | 300 mesh pass | 300 mesh pass | $15\mu$ | |
| Amount added (PHR) | 10 | 20 | 40 | 2 | 10 | 5 | |

What is claimed is:

1. In an electro-chromic display wherein the outer frame of the display, comprising a pair of oppositely disposed substrates, confines an electrolyte, the improvement comprising joining the peripheral edges of said oppositely disposed substrates with an addition reaction type silicone resin adhesive containing an inorganic substance in the form of a fine powder, said inorganic substance preventing the electrolyte from leaking out of the display in gaseous form through the adhesive.

2. An electro-chromic display as claimed in claim 1 wherein the inorganic substance is aluminum, alumina, titanium oxide, silicon oxide or boron nitride.

3. An electro-chromic display as claimed in any of claim 1 or 2 wherein an inorganic substance is added in an amount between 2 and 100 PHR to the addition reaction type silicone resin adhesive.

* * * * *